(12) United States Patent
Faith et al.

(10) Patent No.: US 11,182,675 B1
(45) Date of Patent: Nov. 23, 2021

(54) SYSTEMS AND METHODS FOR ADAPTIVE TRAINING NEURAL NETWORKS

(71) Applicant: Deep Labs Inc., San Francisco, CA (US)

(72) Inventors: Patrick Faith, Pleasanton, CA (US); Scott Edington, Arlington, VA (US)

(73) Assignee: DEEP LABS INC., San Francisco, CA (US)

( * ) Notice: Subject to any disclaimer, the term of this patent is extended or adjusted under 35 U.S.C. 154(b) by 0 days.

(21) Appl. No.: 17/323,275

(22) Filed: May 18, 2021

(51) Int. Cl.
 - *G06N 3/00* (2006.01)
 - *G06K 9/62* (2006.01)
 - *G06N 3/08* (2006.01)
 - *G06Q 20/40* (2012.01)

(52) U.S. Cl.
 CPC ........... *G06N 3/082* (2013.01); *G06K 9/6228* (2013.01); *G06K 9/6257* (2013.01); *G06Q 20/4016* (2013.01)

(58) Field of Classification Search
 CPC .... G06N 3/082; G06K 9/6228; G06K 9/6257; G06Q 20/4016
 See application file for complete search history.

(56) References Cited

U.S. PATENT DOCUMENTS

2002/0054694 A1* 5/2002 Vachtsevanos ....... G06T 7/0006 382/111

OTHER PUBLICATIONS

Xu et al. "Graph wavelet neural network," 2019, arXiv preprint arXiv:1904.07785 (13 pages) (Year: 2019).*

Jesus Rodriguez, "DeepMind Open Sourced This New Architecture to Improve Long-Term Memory in Deep Learning Systems", (Jan. 6, 2021), available at https://medium.com/dataseries/deepmind-open-sourced-this-new-architecture-to-improve-long-term-memory-in-deep-learning-systems-dab7ed82986f (last accessed Jun. 11, 2021) (7 pages).

Francesco Casalegno, "Graph Convolutional Networks—Deep Learning on Graphs", (Jan. 22, 2021), available at https://towardsdatascience.com/graph-convolutional-networks-deep-99d7fee5706f (10 pages).

Jesus Rodriguez, "Microsoft Explores Three Key Mysteries of Ensemble Learning", (Jan. 27, 2021), available at https://medium.com/dataseries/microsoft-explores-three-key-mysteries-of-ensemble-learning-88dc4df831bd (5 pages).

Javaid Nabi, "Recurrent Neural Networks (RNNs)", (Jul. 11, 2019), available at https://towardsdatascience.com/graph-convolutional-networks-deep-99d7fee5706f (13 pages).

* cited by examiner

*Primary Examiner* — David F Dunphy
(74) *Attorney, Agent, or Firm* — Finnegan, Henderson, Farabow, Garrett & Dunner, LLP (57) ABSTRACT

The present disclosure relates to systems and methods for creating and training neural networks. The method includes collecting a set of signals from a database; applying a transform to each signal to create a modified set of signals, wherein signals of the modified set of signals are wavelets; iteratively, for each of a subset of the modified signals: training the neural network using a modified signal of the subset by adding at least one node to the neural network in response to an error function of an analysis of the modified signal exceeding a threshold; removing nodes from the neural network with activation rates below an activation rate threshold; and grouping each node into a lobe among a plurality of lobes, wherein nodes belonging to a lobe have a common characteristic.

20 Claims, 8 Drawing Sheets

SYSTEMS AND METHODS FOR ADAPTIVE TRAINING NEURAL NETWORKS

TECHNICAL FIELD

The present disclosure relates generally to the field of neural networks. More specifically, and without limitation, this disclosure relates to systems and methods for creating and shaping neural networks based on input wavelet characteristics for use in monetary transactions and other data analysis.

BACKGROUND

Existing methods of transaction fraud detection rely on models of transactions that determine if a transaction is fraudulent by comparing transaction characteristics, such as amount, or transaction location, to previous valid transactions. However, these types of detection methods are often application-specific, and rely on humans to identify and record indicators of fraud. An organization cannot reuse its consumer fraud detection system to identify commercial fraud, for instance.

In response, some organizations have turned to neural networks, which allow ingestion of many data sources and can identify previously-unknown patterns in transactions corresponding to fraud. These neural networks, however, are also limited. A versatile neural network, capable of detecting subtle patterns in large data sets, typically requires proportionally large computational resources. In cases where millions of transactions occur each day, such as for credit card transaction processing, large, complex neural networks based on historical transactions introduce latency, slowing approval of a transaction and harming user experience.

Further, once a neural network is established and trained, the neural network is limited in applicability to other data sets. For example, if a credit card company has a neural network operating to detect fraud, and then identifies a new data type not present when training the neural network, the company would be forced to reconstruct and retrain the neural network.

Additionally, establishing and training neural networks requires expert skill to design the neural network shape, such as the number of neurons, the number of layers, and selection of training parameters including time and training set size. This complexity requires significant investment of time and money prior to a neural network being operational. In some cases, it may be discovered that a neural network is unable to accurately analyze a data source, resulting in a lost investment of time and money.

Accordingly, self-constructing, self-optimizing, versatile neural networks capable of analyzing a variety of events with large data sets may address the needs felt in the financial sector to verify transactions, while also being applicable to multiple other industries that requires quick access to neural networks providing accurate analysis of large data sets.

SUMMARY

One aspect of the present disclosure is directed to a system for creating and training a neural network. The system comprises a memory storing instructions; and at least one processor configured to execute the instructions to perform operations. The operations include collecting a set of signals from a database; applying a transform to each signal to create a modified set of signals, wherein signals of the modified set of signals are wavelets; iteratively, for each of a subset of the modified signals: training the neural network using a modified signal of the subset by adding at least one node to the neural network in response to an error function of an analysis of the modified signal exceeding a threshold; removing nodes from the neural network with activation rates below an activation rate threshold; and grouping each node into a lobe among a plurality of lobes, wherein nodes belonging to a lobe have a common characteristic.

Another aspect of the present disclosure is directed to a method for creating and training a neural network. The method includes the steps of collecting a set of signals from a database; applying a transform to each signal to create a modified set of signals, wherein signals of the modified set of signals are wavelets; iteratively, for each of a subset of the modified signals: training the neural network using a modified signal of the subset by adding at least one node to the neural network in response to an error function of an analysis of the modified signal exceeding a threshold; removing nodes from the neural network with activation rates below an activation rate threshold; and grouping each node into a lobe among a plurality of lobes, wherein nodes belonging to a lobe have a common characteristic.

Other systems, methods, and computer-readable media are also discussed herein.

DETAILED DESCRIPTION

The disclosed embodiments relate to systems and methods for creating and training a neural network to categorize data. In some embodiments, the categorization may be used to identify fraud and authorize transactions, for instance. Additional applications are also envisioned, including categorizing speech, text, audio, images, sensor data signals such as in manufacturing processes, and the like. Embodiments of the present disclosure may be implemented using a general-purpose computer. Alternatively, a special-purpose computer may be built according to embodiments of the present disclosure using suitable logic elements.

Figure 1:
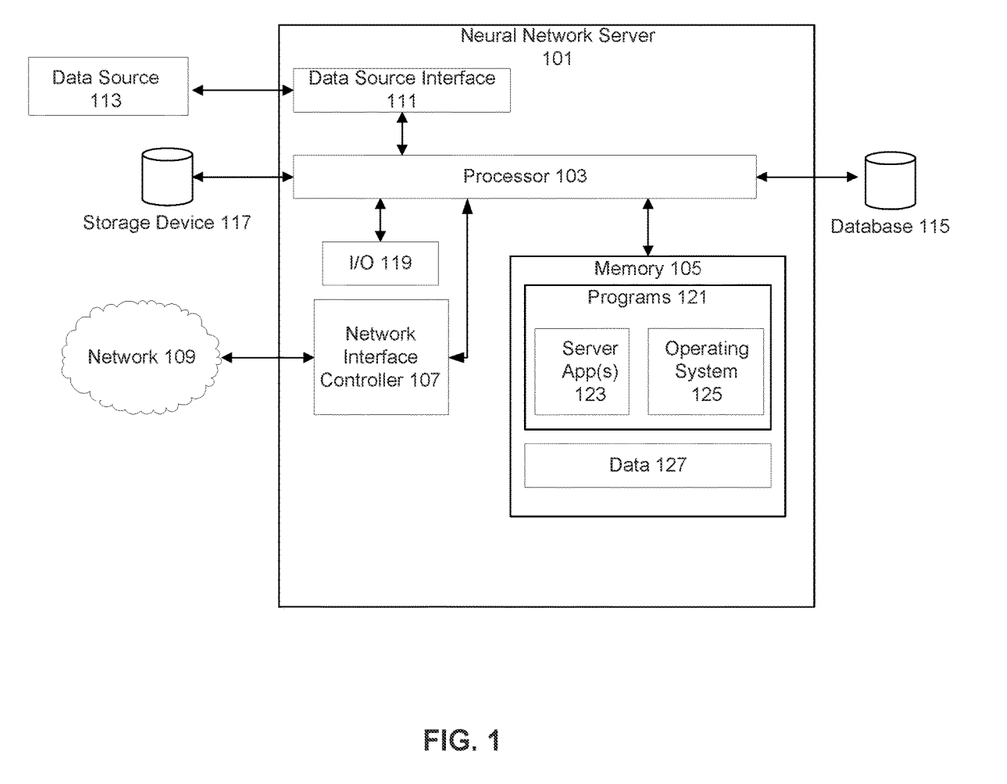
FIG. 1 is a block diagram of an exemplary computing device with which the systems and methods of the present disclosure may be implemented.

FIG. 1 is a block diagram that illustrates an exemplary neural network server 101 suitable for implementing the disclosed systems and methods. Neural network server 101 may reside on a single server farm or may be distributed across a plurality of server farms.

As depicted in FIG. 1, neural network server 101 may include at least one processor (e.g., processor 103), at least one memory (e.g., memory 105), and at least one network interface controller (NIC) (e.g., NIC 107).

Processor 103 may comprise a central processing unit (CPU), a graphics processing unit (GPU), or other similar circuitry capable of performing one or more operations on a data stream. Processor 103 may be configured to execute instructions that may, for example, be stored on memory 105. In some embodiments, processor 103 may also comprise a neural processing unit, field-programmable gate array, or quantum CPU.

Memory 105 may be volatile memory (such as RAM or the like) or non-volatile memory (such as flash memory, a hard disk drive, or the like). Memory 105 may store instructions for operation by processor 103.

NIC 107 may be configured to facilitate communication with neural network server 101 over at least one computing network (e.g., network 109). Communication functions may thus be facilitated through one or more NICs, which may be wireless and/or wired and may include an Ethernet port, radio frequency receivers and transmitters, and/or optical (e.g., infrared) receivers and transmitters. The specific design and implementation of the one or more NICs depend on the computing network 109 over which neural network server 101 is intended to operate. For example, in some embodiments, neural network server 101 may include one or more wireless and/or wired NICs designed to operate over a GSM network, a GPRS network, an EDGE network, a Wi-Fi or WiMax network, and a Bluetooth® network. Alternatively or concurrently, neural network server 101 may include one or more wireless and/or wired NICs designed to operate over a TCP/IP network.

Processor 103, memory 105, and/or NIC 107 may comprise separate components or may be integrated in one or more integrated circuits. The various components in neural network server 101 may be coupled by one or more communication buses or signal lines (not shown).

As further depicted in FIG. 1, neural network server 101 may include a data source interface 111 configured to communicate with one or more data sources (e.g., data source 113). Neural network server 101 may communicate with data source 113 (or any other server) using a RESTful API or other high speed interface, such as remote procedure call. Although depicted as separate in FIG. 1, data source interface 111 may, in whole or in part, be integrated with NIC 107. In some embodiments, data source 113 may communicate with neural network server 101 using a software development kit in order to provide data and receive processing results. As an example, data source 113 may include databases storing historical transactions and account details, and may also process and/or approve transactions. Data source 113 may also be an electronic sensor, a database on past sensor data, or a data source accessible via an API. Further, neural network server 101 may connect directly to data sources (not shown) via network 109. For instance, data source 113 may provide communication protocols for neural network server 101 to use in order to retrieve or receive data from data providers. In some embodiments, neural network server 101 may operate as a virtual or cloud server. For example, neural network server 101 may include a plurality of servers that distribute processing via a thread library.

Neural network server 101 may include and/or be operably connected to a database 118 and/or a storage device 117. Database 115 may represent a wavelet database or other digital database, which may be stored, in whole or in part, on neural network server 101 and/or, in whole or in part, on a separate server (e.g., one or more remote cloud storage servers). Storage device 117 may be volatile (such as RAM or the like) or non-volatile (such as flash memory, a hard disk drive, or the like). Neural network server 101 may also include a local database, such as data stored in RAM.

I/O module 119 may enable communications between processor 103 and memory 105, database 115, and/or storage device 117. In some scenarios, neural network server 101 may not include an I/O module 119, such as embedded installations.

As depicted in FIG. 1, memory 105 may store one or more programs 121. For example, programs 121 may include one or more server applications 123, such as applications that facilitate graphic user interface processing, facilitate communications sessions using NIC 107, facilitate exchanges with data source 113, or the like. By way of further example, programs 121 may include an operating system 125, such as DARWIN, RTXC, LINUX, iOS, UNIX, OS X, WINDOWS, or an embedded operating system such as VXWorkS. Operating system 125 may include instructions for handling basic system services and for performing hardware dependent tasks. In some implementations, operating system 125 may comprise a kernel (e.g., UNIX kernel). Memory 105 may further store data 127, which may be computed results from one or more programs 121, data received from NIC 107, data retrieved from database 115 and/or storage device 117, and/or the like.

Each of the above identified instructions and applications may correspond to a set of instructions for performing one or more functions described above. These instructions need not be implemented as separate software programs, procedures, or modules. Memory 105 may include additional instructions or fewer instructions. Furthermore, various functions of neural network server 101 may be implemented in hardware and/or in software, including in one or more signal processing and/or application specific integrated circuits.

Figure 2:
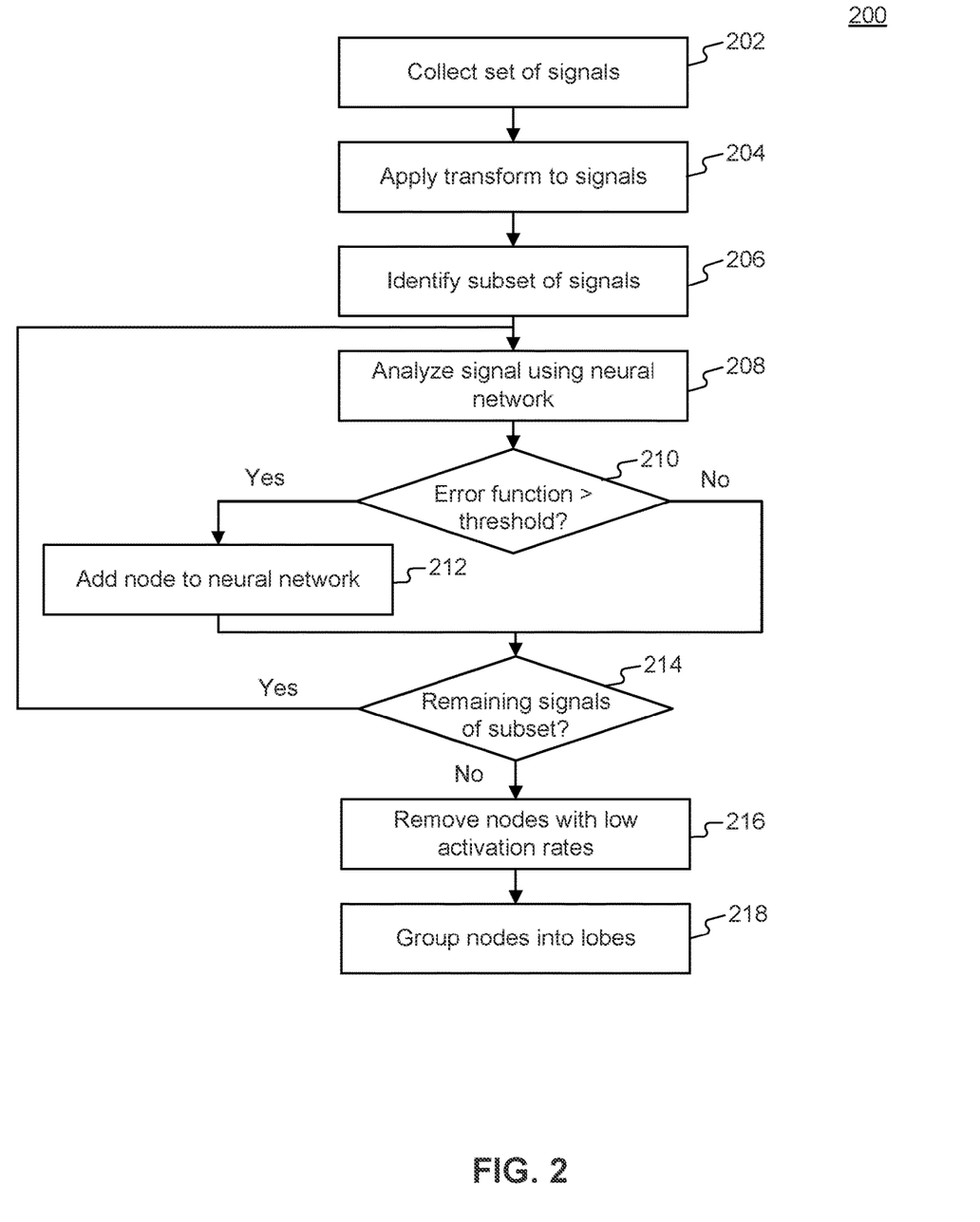
FIG. 2 is a flowchart of an exemplary method for creating and training a neural network, consistent with the disclosed embodiments.

FIG. 2 is a flowchart of an exemplary method for creating and storing personas based on wavelets, consistent with the disclosed embodiments. Neural network server 101 may implement steps of process 200, for example. Steps of process 200 may also be distributed among a plurality of servers, such as in a cloud configuration.

At step 202, process 200 may collect a set of signals, from a database, such as database 115. The signals may represent actions of a person, for instance, such as website logins, movement, purchases, sent messages, phone calls, and the like. Additionally, the signals may be recorded from data source 113. The signals may include, for example, free text, analog waveforms produced by a sensor such as a microphone or strain gauge, digital waveforms produced by, for instance, a data logger, and values representing fielded data such as transaction amounts and parties or health information. The data may be stored in a database structure, such as an SQL database, or in a raw data format. Further, process 200 may include receiving a data signal, digitizing the data signal, and storing the data signal.

At step 204, process 200 may apply a transform to each signal to create a modified set of signals, wherein signals of the modified set of signals are wavelets. A wavelet may be, for instance, data represented as an oscillation. The wavelet need not be received in the form of an oscillation but may be represented in any appropriate form (e.g., an array, a digital signal, or the like). The wavelet may be received from one or more memories (e.g., a volatile memory such as a random access memory (RAM) and/or a non-volatile memory such as a hard disk) and/or across one or more computer networks (e.g., the Internet, a local area network (LAN), or the like). Alternatively, the processor may receive data and convert the data into a wavelet. For example, the processor may receive a transaction having associated properties (such as time, location, merchant, amount, etc.) and may convert the transaction into a wavelet or into an array, vector, matrix, tensor, or other format that represents a wavelet in step 204.

Figure 3A:
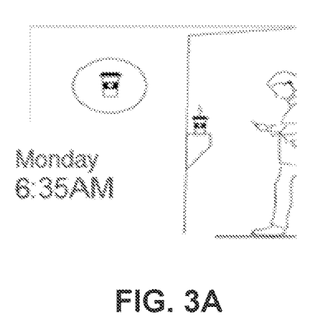
FIGS. 3A-3D are diagrams of potential states for a person, consistent with the disclosed embodiments.
Figure 3B:
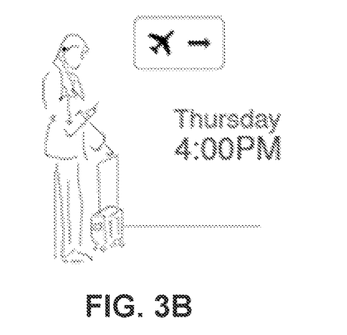
Figure 3C:
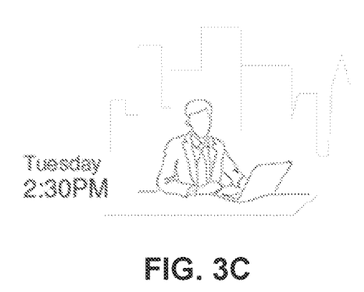
Figure 3D:
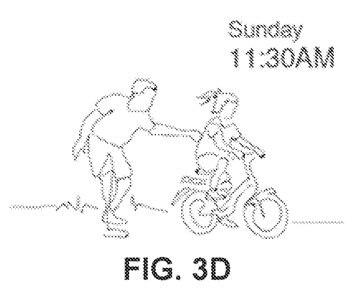

Steps 202 and 204 may be further understood by reference to FIGS. 3A-3D and 4. FIGS. 3A-3D show diagrams of potential states for a person for use in constructing a wavelet, consistent with the disclosed embodiments. In FIG. 3A, a man is purchasing coffee at 6:35 AM on a Monday. FIG. 3B shows the man waiting in an airport at 4:00 PM on a Thursday. FIG. 3C shows the man at his office on 2:30 PM on a Tuesday. Lastly, FIG. 3D illustrated the man teaching his daughter to ride a bike at 11:30 AM on a Sunday. Each of FIGS. 3A-3D thus show different states in which the man may be: purchasing coffee, waiting on a flight, working at his office, and playing with his child. Actions and states of other entities are envisioned as well. For example, actions and states of a car, product, store, zip code, website, app, or IP address may be used in constructing a wavelet.

Figure 4:
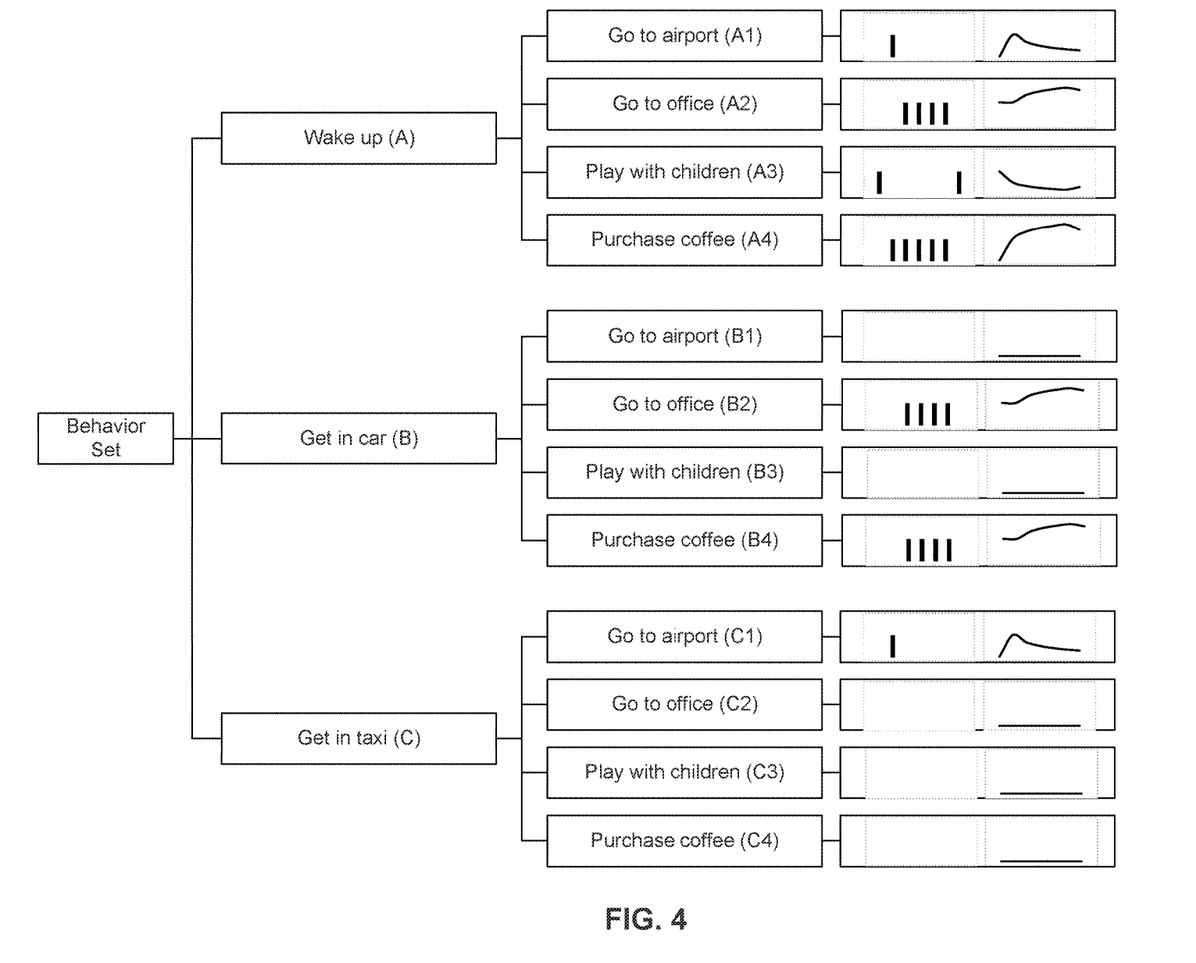
FIG. 4 is a diagram of wavelet construction based on permutations of behaviors, consistent with the disclosed embodiments.

Thus, wavelets representing a person's activities may be constructed based on permutations of behaviors, such as those illustrated in FIG. 4. The illustrated behavioral set, which may form the basis of constructing a wavelet, includes three first actions corresponding to indications and four second actions corresponding to indications, for a total of twelve possible action sequences. For example, the man illustrated in FIGS. 3A-3D may wake up (A), get in his car (B), or get in a taxi (C). Indications of each action may be an alarm on his phone, a remote start using an app on his phone, or calling a taxi operator, respectively. After each of these first activities, the man may go to the airport, go to the office, play with his children, or purchase coffee. Combinations of actions may produce, for instance, thousands of networked events and transactions, which may be converted into wavelets and propagated through neural networks, such as in real time or in batches.

Further, each sequence may be associated with a frequency. FIG. 4 is a diagram of wavelet construction based on permutations of behaviors, consistent with the disclosed embodiments. As shown in FIG. 4, the man wakes up and goes to the airport (A1) once per week, as illustrated by the corresponding histogram. The man also gets into the car and goes to the office (B2) four days per week. As another example, the man gets in a taxi and plays with his children (C3) zero days per week. In some embodiments, histogram counts as illustrated in FIG. 4 may be smoothed or analyzed using a moving average, as illustrated in the graphs adjacent to respective histograms in FIG. 4. Thus, the transformation applied to the signals in step 204 may be a smoothing function, for instance. Additional data conditioning and transforming techniques may also be used in step 204, such as outlier removal, "squishing" functions such as hyperbolic tangent and other sigmoid functions, a Dirac function, Fourier or Laplace transformations, and the like.

FIG. 4 illustrates a simplified behavior set for a person, but real-world behavior sets have thousands or even millions of sequence permutations. Further complicating a behavior set is that some sequences may be redundant. For example, wake up and go to the airport (A1) occurs at the same frequency as get in taxi and go to the airport (C1). Additionally, permutations may be reversed. That is, while FIG. 4 shows get in car and purchase coffee (B4), a full behavior set would also include purchase coffee and then get in car. Additional sequence layers (3, 4, 5, etc.) may also be added to provide more thorough actions sequences, such as wake up, play with children, get in car, go to office.

Training models with potentially millions of permutations and sequences of indefinite length results in long training periods for neural networks and other models, as well as high latency for anomaly detection and predictive analysis. Thus, in order to reduce latency, the behavioral set may be trimmed. For example, in FIG. 4, the sequence get in taxi and go to office (C2) has a frequency of zero, indicating that the man never takes a taxi to the office. Likewise, the sequence get in car and go to airport (B1) also has a frequency of zero, because the man never drives his car to the airport. Thus, these low-frequency events may be eliminated to increase training speed and decrease latency of models.

Similarly, wavelets may be constructed based on occurrences of word sequences in text. Further, a sequence may be one item. For instance, a sequence may be the occurrence of the word "hypothesis" in a book, and occurrences of the word "hypothesis" in the book may be used to create a wavelet. In addition to discrete data points, continuous signals, such as data measurements from a temperature sensor, stock prices, blood pressure and other health metrics, may also form the basis of a wavelet.

Returning to process 200 as shown in FIG. 2, after transforming data signals into wavelets in step 204, process 200 proceeds to step 206 to identify a subset of the signals for use in training the neural network. The subset may be a set portion of a data set, for instance, 80% of the collected signals. The subset may also be dynamic, with additional signals being added to the subset and used for training until the neural network reaches a threshold accuracy. The subset may be randomly selected from the modified set of signals. Alternatively, the subset may be selected according to modified signal characteristics. For example, the subset may include signals corresponding to wavelets having a threshold amplitude, a threshold number of maxima, decaying functions, exponential functions, and the like. In this manner, the neural network may be trained to focus on data having some desired characteristic while avoiding training on noisy or undesired data.

Process 200 begins creating and training the neural network iteratively, for each of the subset of modified signals, at step 208. In some scenarios, such as the first training iteration, step 208 may also include initializing a neural network with at least one node. Step 208 analyzes a modified signal using the neural network. For example, the neural network may include at least one node, with each node corresponding to a node matrix representing a wavelet. An input to a node may comprise a unit vector and a magnitude of the unit vector. An output of the node may be calculated by determining a plurality of products of input unit vectors and the corresponding magnitudes; determining a sum of the plurality of products; determining a vector by multiplying the sum and the node matrix; setting the output to be a unit vector of the vector and a magnitude of the vector.

The output may be compared to a desired output in an error function at step 210. For example, the error function may represent a distance between the output vector and the desired output vector. If the error function is too large, such that step 210 is YES, process 200 may proceed to step 212 and add at least one node to the neural network. If the error function is less than a threshold, such that step 210 is NO, process 200 may proceed to step 214 to determine if there are remaining signals in the subset, and return to step 208 if additional modified signals remain (step 214 YES).

Figure 5A:
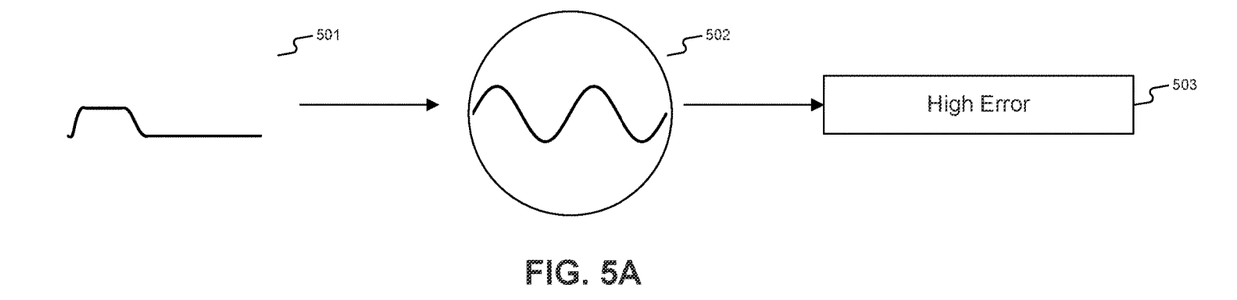
FIGS. 5A and 5B are diagrammatic illustrations of adding a node to a neural network, consistent with the disclosed embodiments.
Figure 5B:
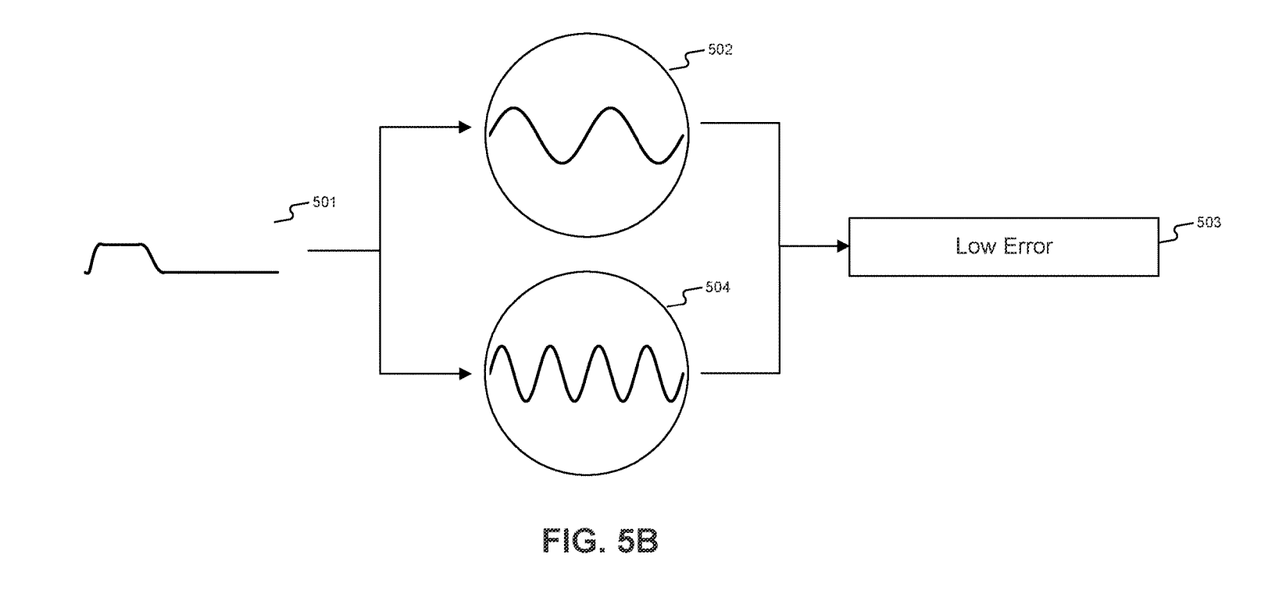

Steps 208-212 may be further understood by reference to FIGS. 5A and 5B showing diagrammatic illustrations of adding a node to a neural network, consistent with the disclosed embodiments. In FIG. 5A, input signal 501 is entered into first node 502. First node 502 is illustrated as corresponding to a wavelet, and a memory may store a matrix corresponding to the wavelet of first node 502. For example, the matrix may store frequencies and magnitudes that, when summed or multiplied, make up the wavelet of the node. The matrix may also or alternatively store range values corresponding to domain values of a wavelet. The input signal 501 may also be represented as a vector or matrix. After input signal 501 is combined with first node 502, an error function 503 may determine that the output of first node 502 has a high error above a threshold. This may indicate, for instance, that first node 502 did not accurately categorize an event or data that produced first signal 501.

In response to the high error of FIG. 5A, process 200 may add a second node as shown in FIG. 5B. Second node 504 may have a different wavelet, as illustrated. In some embodiments, new nodes may be initialized with a random node matrix representing a random wavelet. Additionally, adding at least one node may comprise adding connections between the added node and pre-existing nodes such that a number of connections of any node is less than a connection maximum. For example, rather than being connected to input signal 501, second node 504 may be connected to first node 502, depending on a random selection of connections. Further, in traditional neural networks, each node of a layer is connected to each node of a subsequent layer. However, in neural networks according to the present disclosure, nodes of layers may have a maximum number of connections, such that nodes of one layer may be connected to all or fewer than all of the nodes of a subsequent layer. In some embodiments, connections of new nodes in a neural network may result in a graph of nodes that are not necessarily arranged into layers. For example, in FIG. 5B, a third note may be added that connects to both first node 502 and second node 504, and a fourth node may connect to second node 504 but not first node 502. Further examples will be provided by reference to FIG. 6A subsequently.

After adding at least one new node to the neural network, process 200 may re-run input signal 501 and continue iterating input signal 501 and adding new nodes until the error function is below a threshold. Alternatively, process 200 may advance to a new input signal, and determine a new error value. As shown in FIG. 5B, the addition of second node 504 may result in a low error in error function 503, indicating that the combined result of first node 502 and second node 504 accurately analyzed input signal 501. The combined result of multiple nodes may be a result of a vector sum of the multiple nodes. Stated differently, an additional node having an identity matrix may be inserted between nodes 502 and 504 and error function 503 to combine the outputs of preceding nodes.

Returning to FIG. 2, after all of the modified signals of the subset have been analyzed (i.e., step 214 is NO), process 200 proceeds to step 216 to remove nodes from the neural network with activation rates below an activation rate threshold. Through steps 208-214, process 200 may add nodes that, due to the random initialization, have a low impact on a final analysis of information. For example, a node may be randomly initialized with a matrix representing a wavelet with a combination of multiple sine waves with high frequencies. The node may not have a significant impact on final results, for instance because the input data do not typically exhibit high frequency variations. Thus, process 200 may store outputs of the node in at least one memory to determine how often the node activates above an activation rate threshold. For instance, the activation may be a vector magnitude, and if the vector magnitude is too low, the node may not be contributing to the neural network analysis while still consuming computational resources and time. Similarly, some nodes may produce results with too great a vector magnitude, which could lead to computational errors that exceed the limits of a computer's processing power. Process 200 may track nodes that activate less than a threshold activation rate, and/or nodes that activate greater than a threshold activation rate, and remove those nodes from the neural network. In some embodiments, this trimming process may occur periodically during training, such as for every training signal or every thousand training signals. Further, the network may be initialized with a shape prior to step 208 of process 200, and reshaped throughout a training period or during analysis of production (i.e., non-training) data. Alternatively, trimming may occur after all training signals have been used, as shown in FIG. 2.

At step 218, process 200 may group each node into a lobe among a plurality of lobes, wherein nodes belonging to a lobe have a common characteristic. For example, process 200 may analyze each node to identify characteristics of the matrix corresponding to each node, and identify nodes having a common characteristic of frequency band, frequency multiple, or amplitude. For example, process 200 may group nodes having wavelets with frequencies less than 10 hertz in a first lobe, 10-20 hertz in a second lobe, 20-30 hertz in a third lobe, and so on. Further, process 200 may group nodes having wavelets with frequencies of 10, 20, 30, 40, and 50 hertz into a first lobe; 100, 200, 300, and 400 hertz into a second lobe, and so on. Further still, process 200 may groups nodes having wavelets offset from a multiple, such as 10, 20, and 30 hertz in a first lobe and 5, 15, and 25 hertz in a second lobe. Wavelets may also have amplitudes, and nodes within amplitude ranges may be grouped together into lobes.

In some embodiments, nodes may have greater activation for data coming from a first source rather than a second source, and nodes may be grouped into lobes depending on activation rates for different sources. Data sources may comprise at least one electronic device used by an individual. For example, a first data source may be a person's phone, and a second data source may be the person's computer. During training, process 200 may use data from both data sources, and store activation rates for nodes in correspondence with the input data source. Process 200 may detect that some nodes activate more frequently for phone data than computer data, and vice versa. Process 200 may then group nodes according to which data source, or combination of data sources, produce higher activation rates.

Further, process 200 may create and store a lobe filter corresponding to a lobe among the plurality of lobes, the lobe filter representing the common characteristic of the lobe. In some embodiments, each lobe may have a corresponding filter, and/or each node may have a corresponding filter. Filters may operate to condition data before being input to nodes of the lobe. Alternatively or additionally, filters may act as logic gates. For example, a first lobe may be activated by high frequency inputs, and a second lobe may be activated by low frequency inputs. A filter for the first lobe may only transmit data to the lobe having a high frequency component, and may also remove a bias in the signal. A filter for the second lobe may only transmit data having a low frequency, and may also remove a bias in the signal. Filters may provide further transforms to data as well, such as a Fourier transform, to, for instance, remove noise or reduce amplitude of an input before processing by the lobe.

In some embodiments, an output of at least one first lobe may be an input to at least one second lobe. That is, lobes may be connected and transfer data similar to individual nodes. Lobe sequences may be randomly generated after grouping at step 218, or lobes may be sequenced and connected according to connection rates of nodes of the lobes prior to step 218. For example, if nodes that are later placed into a first lobe have a certain number or greater connections feeding nodes that are later placed into a second lobe, the output of the first lobe may be used as the input of the second lobe. A filter for a lobe may condition the output of a preceding lobe to smooth, squish, normalize, or otherwise prior to analysis by a lobe. A lobe may have multiple input connections and multiple output connections.

In step 218, process 200 may also provide recursive grouping of nodes. For example, process 200 may group nodes of each lobe into successively smaller groupings, each successively smaller grouping corresponding to a respective common characteristic. A lobe may contain nodes corresponding to frequencies between 10 and 20 hertz. The lobe may further divide and group the nodes into layers of nodes corresponding to 10-15 hertz and 15-20 hertz. These layers may be further subdivided into folds, such as a fold for 10-11 hertz, 11-12 hertz, etc. Additionally, process 200 may create and store a filter corresponding to each of the successively smaller groupings based on the common characteristic of the successively smaller group. In some embodiments, the neural network may include millions or billions of nodes, and allow a one-to-billions categorization. For instance, each layer may correspond to a person, and filters may direct signals to a correct layer for a person based on data source identifier. In some embodiments, lobes may be connected to other lobes, similar to interconnection of nodes. Further, a lobe may be a container of nodes, container of other lobes, or a container of nodes and lobes.

Figure 6A:
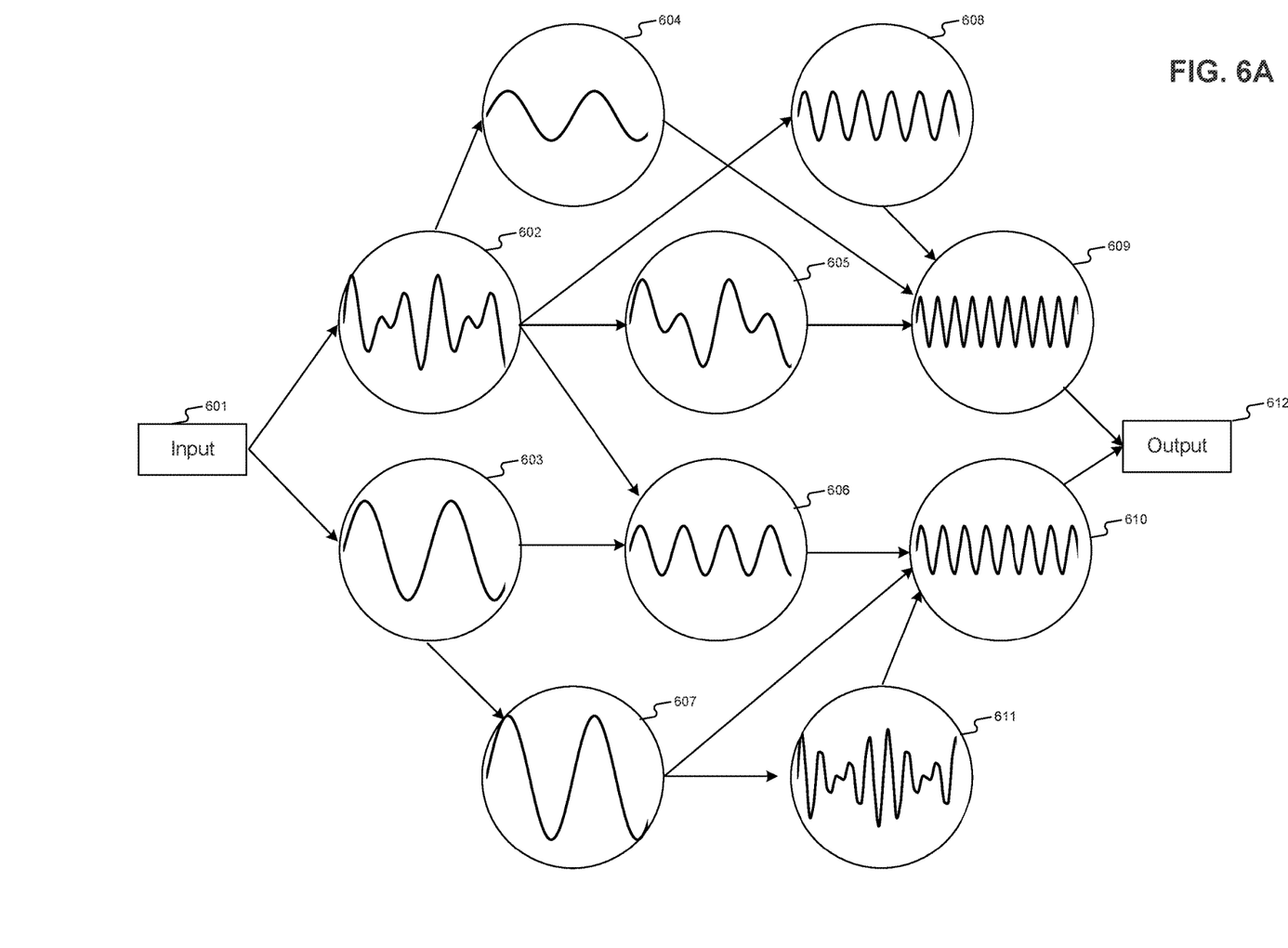
FIG. 6A-6C are diagrammatic illustrations of node connections and groupings, consistent with the disclosed embodiments.
Figure 6B:
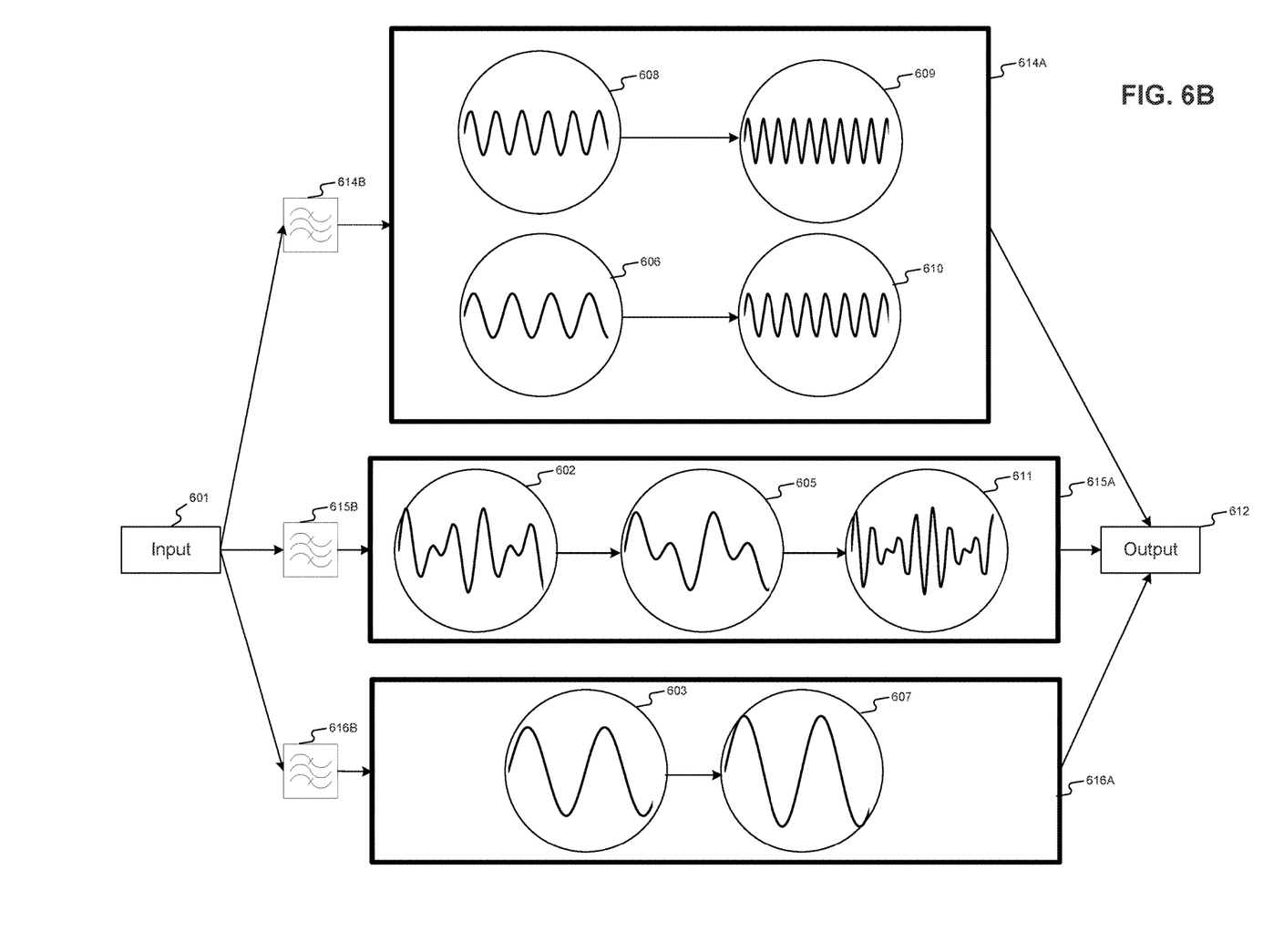
Figure 6C:
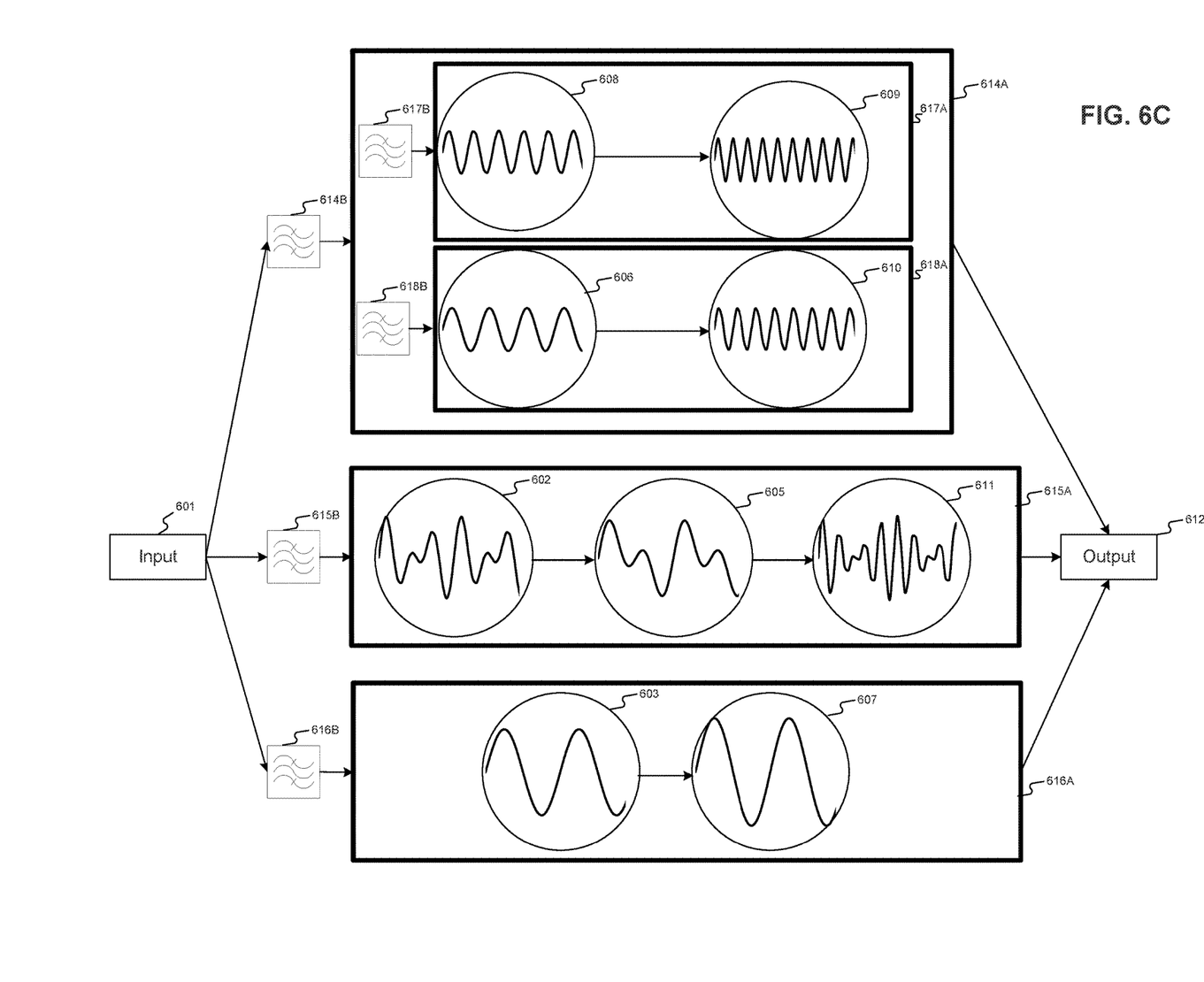

Steps 216 and 218 may be further understood by reference to FIGS. 6A-6C showing diagrammatic illustrations of node connections and groupings, consistent with the disclosed embodiments.

FIG. 6A illustrates a neural network that may exist, for instance, after training in steps 208-212. As stated previously, nodes may be initialized with random wavelets and random connections, resulting in a neural network with a random graph. FIG. 6A illustrates an input 601, a plurality of nodes 602-611, and an output 612. Input 601 may initialize an analysis of a signal by sending the signal, which may be represented by a vector, matrix, analog signal, digitized signal, and the like, to nodes. For instance, input 601 sends a signal to nodes 602 and 603. Further, each node 602-611, corresponds to a wavelet, such as a high frequency wave in node 609, a low frequency wave in node 604, a high amplitude wave in node 607, or a combination of waves in node 602.

As shown, nodes may be connected to differing numbers of other nodes. For example, node 602 has one input (from input 601) and sends its output to three other nodes (node 608, node 605, and node 606). Some nodes receive multiple inputs (e.g., node 610), while others receive a single input (e.g., node 607). Additionally, some nodes send outputs to multiple other nodes (e.g., node 602), while others send outputs to a single node (e.g., node 608).

FIG. 6B illustrates the neural network of FIG. 6A after removing nodes and grouping nodes in steps 216 and 218 of process 200. For example, node 604 of FIG. 6A has been removed, indicating that node 604 had a low activation rate during training. Further, nodes have been grouped according to similar characteristics. For example, nodes 606, 608, 609, and 610, which correspond to wavelets having similar frequencies, have been grouped into lobe 614A. Nodes 602, 605, and 611 represent wavelets having combinations of other waves, and are accordingly grouped into lobe 615A. Further, in some embodiments, connections between nodes established during training may be retained after grouping nodes together into a lobe. For example, nodes 608 and 609 were connected in FIG. 6A, and those connections have been retained for the grouped neural network in FIG. 6B. In some scenarios, a node may be grouped separate from its initial connections. For example, node 611 is connected to node 607 in FIG. 6A, but node 611 is in lobe 615A, while node 607 is in lobe 616A. A displaced node such as this may be connected within the corresponding lobe randomly, for instance, or in a similar sequence as in the original neural network.

Further, as shown in FIG. 6B, lobes 614A, 615A, and 616A are associated with filters 614B, 615B, and 616B. Filter 614B may filter input signals according to a common characteristic for lobe 614A. For instance, filter 614B may pass signals having frequencies with low amplitudes but not signals having high amplitudes, because nodes 606, 608, 609, and 610 correspond to wavelets with low amplitudes. Similarly, filter 616B may pass signals having high amplitudes into lobe 616A, but not low amplitudes, as a common characteristic of nodes 603 and 607 is a high amplitude. Filter 615B may pass signals having a linear combination of frequencies into nodes of lobe 615A.

As stated previously, nodes in a lobe may be further grouped into smaller groupings. FIG. 6C illustrates that lobe 614A, comprising nodes 608, 606, 609, and 610, is divided into layers 617A and 618A, with corresponding filters 617B and 618B. Filters 617B and 618B may correspond to features of nodes in the corresponding layers. For example, an input signal having a low amplitude and comprises a frequency that is a multiple of 10 hertz may pass filter 614B and 617B, but not 618B. In this way, filters may help route input data to lobes, layers, and folds containing nodes that are relevant to analysis of the input data, while bypassing nodes that are not relevant, allowing a single neural network to process a wide variety of inputs, efficiently, based on the shape of the neural network.

Once the neural network is established by process 200, the neural network may analyze new data. An input may arrive at input 601, and may also be transformed. For example, if the input is an event, a transform, such as a Fourier transform, Laplace transform, smoothing average, or other data conditioning, may be applied to the input data to create an input wavelet. The input wavelet may be processed with at least one lobe among the plurality of lobes of the neural network based on a comparison between the input wavelet and the filter corresponding to the at least one lobe. The outputs of any lobe that received the input signal, due to respective filters passing and/or conditioning an input to the lobe, may be combined as described above, and process 200 may output the combined output to a user device for display. In some embodiments, the output may be a one-hot vector, wherein each element of the vector corresponds to a category, and process 200 may display the category corresponding to the "hot" element of the vector. Alternatively, the output may be a vector with continuous values, and the output may identify a highest (or lowest) element and display a category corresponding to the identified element. Further still, the output may be a continuous value, such as representing a probability, predicted price, mechanical or chemical performance metric of a process, and the like.

In some cases, a signal may input a neural network but fail to pass through any filter, stopping analysis of the signal. Neural networks according to the present disclosure may introduce a new, random node, layer, fold, or lobe to analyze the signal. In this manner, neural networks according to the present disclosure may adapt to new data, while still functioning to categorize and analyze data similar to previously-seen data.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for creating and training a neural network, comprising:
a memory storing instructions; and
at least one processor configured to execute the instructions to perform operations comprising:
collecting a set of signals from a database;
applying a transform to each signal to create a modified set of signals, wherein signals of the modified set of signals are wavelets;
iteratively, for each of a subset of the modified signals:
training the neural network using a modified signal of the subset by adding at least one node to the neural network in response to an error function of an analysis of the modified signal exceeding a threshold;
removing nodes from the neural network with activation rates below an activation rate threshold; and
grouping each node into a lobe among a plurality of lobes, wherein nodes belonging to a lobe have a common characteristic.

2. The system of claim 1, wherein adding at least one node comprises adding connections between the added node and pre-existing nodes such that a number of connections of any node is less than a connection maximum.

3. The system of claim 1, wherein the operations further comprise:
storing a lobe filter corresponding to a lobe among the plurality of lobes, the lobe filter representing the common characteristic of the lobe.

4. The system of claim 3, wherein the operations further comprise:
grouping nodes of each lobe into successively smaller groupings, each successively smaller grouping corresponding to a respective common characteristic; and
storing a filter corresponding to each of the successively smaller groupings based on the common characteristic of the successively smaller group.

5. The system of claim 4, wherein the common characteristics comprise at least one of a frequency band, a frequency multiple, an amplitude, or a data source.

6. The system of claim 5, wherein the data source comprises at least one electronic device used by an individual.

7. The system of claim 1, wherein the operations further comprise:
receiving input data;
applying the transform to the input data to create an input wavelet;
processing the input wavelet with at least one lobe among the plurality of lobes based on a comparison between the input wavelet and the filter corresponding to the at least one lobe;
combining outputs of the at least one lobe; and
outputting the combined output to a user device for display.

8. The system of claim 1, wherein
each node is connected to a plurality of nodes and corresponds to a node matrix representing a wavelet;
inputs to nodes comprise at least one unit vector and a corresponding magnitude; and the operations further comprise:
calculating outputs of nodes by:
determining a plurality of products of input unit vectors and the corresponding magnitudes;
determining a sum of the plurality of products;
determining a vector by multiplying the sum and the node matrix;

setting the output to be a unit vector of the vector and a magnitude of the vector.

9. The system of claim 7, wherein new nodes are initialized with a random node matrix representing a random wavelet.

10. The system of claim 1, wherein an output of at least one first lobe is an input to at least one second lobe.

11. A method for creating and training a neural network, comprising:
collecting a set of signals from a database;
applying a transform to each signal to create a modified set of signals, wherein signals of the modified set of signals are wavelets;
iteratively, for each of a subset of the modified signals:
training the neural network using a modified signal of the subset by adding at least one node to the neural network in response to an error function of an analysis of the modified signal exceeding a threshold;
removing nodes from the neural network with activation rates below an activation rate threshold; and
grouping each node into a lobe among a plurality of lobes, wherein nodes belonging to a lobe have a common characteristic.

12. The method of claim 11, wherein adding at least one node comprises adding connections between the added node and pre-existing nodes such that a number of connections of any node is less than a connection maximum.

13. The method of claim 11, further comprising:
storing a lobe filter corresponding to a lobe among the plurality of lobes, the lobe filter representing the common characteristic of the lobe.

14. The method of claim 13, further comprising:
grouping nodes of each lobe into successively smaller groupings, each successively smaller grouping corresponding to a respective common characteristic; and
storing a filter corresponding to each of the successively smaller groupings based on the common characteristic of the successively smaller group.

15. The method of claim 14, wherein the common characteristics comprise at least one of a frequency band, a frequency multiple, an amplitude, or a data source.

16. The method of claim 15, wherein the data source comprises at least one electronic device used by an individual.

17. The method of claim 11, further comprising:
receiving input data;
applying the transform to the input data to create an input wavelet;
processing the input wavelet with at least one lobe among the plurality of lobes based on a comparison between the input wavelet and the filter corresponding to the at least one lobe;
combining outputs of the at least one lobe; and
outputting the combined output to a user device for display.

18. The method of claim 11, wherein
each node is connected to a plurality of nodes and corresponds to a node matrix representing a wavelet;
inputs to nodes comprise at least one unit vector and a corresponding magnitude; and the operations further comprise:
calculating outputs of nodes by:
determining a plurality of products of input unit vectors and the corresponding magnitudes;
determining a sum of the plurality of products;
determining a vector by multiplying the sum and the node matrix;
setting the output to be a unit vector of the vector and a magnitude of the vector.

19. The method of claim 17, wherein new nodes are initialized with a random node matrix representing a random wavelet.

20. The method of claim 11, wherein an output of at least one first lobe is an input to at least one second lobe.

* * * * *